(12) United States Patent
Schnabler et al.

(10) Patent No.: US 11,933,418 B2
(45) Date of Patent: Mar. 19, 2024

(54) DOSING UNIT FOR DOSING FLUIDS, DOSING STATION AND DOSING TIP FOR A DOSING UNIT

(71) Applicant: BUERKERT WERKE GMBH & CO. KG, Ingelfingen (DE)

(72) Inventors: Paul Schnabler, Ingelfingen (DE);
Fabian Mittnacht, Ingelfingen (DE);
Jacqueline Zenth, Ingelfingen (DE);
Alexandra Bauer, Ingelfingen (DE);
Ralf Scheibe, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 107 days.

(21) Appl. No.: 16/850,911

(22) Filed: Apr. 16, 2020

(65) Prior Publication Data

US 2020/0332912 A1 Oct. 22, 2020

(30) Foreign Application Priority Data

Apr. 16, 2019 (DE) .................... 10 2019 110 074.7

(51) Int. Cl.
*F16K 31/06* (2006.01)
*F16K 21/04* (2006.01)

(52) U.S. Cl.
CPC .......... *F16K 31/0624* (2013.01); *F16K 21/04* (2013.01)

(58) Field of Classification Search
CPC .. F16K 31/0624; F16K 31/0644; F16K 21/04; F16K 27/003; F16K 15/147; F16K 15/1402; F16K 15/1472; F16K 15/148; B65B 37/16; B65B 3/26; G01F 13/00
See application file for complete search history.

(56) References Cited

U.S. PATENT DOCUMENTS

| 3,369,666 | A | * | 2/1968 | Hultgren | B01D 27/08 |
| | | | | | 210/130 |
| RE27,399 | E | * | 6/1972 | D'Urso | F16K 15/147 |
| | | | | | 137/516.25 |
| 4,535,819 | A | * | 8/1985 | Atkinson | F16K 15/1472 |
| | | | | | 604/122 |
| 4,566,493 | A | * | 1/1986 | Edwards | F16K 15/144 |
| | | | | | 604/122 |
| 5,010,925 | A | * | 4/1991 | Atkinson | F16K 15/147 |
| | | | | | 137/846 |
| 5,524,792 | A | | 6/1996 | Wakabayashi et al. | B67D 5/62 |
| 5,924,605 | A | | 7/1999 | Baudin et al. | 222/494 |

(Continued)

FOREIGN PATENT DOCUMENTS

| CN | 102530277 | 7/2012 | ............. B65B 1/30 |
| DE | 19937549 | 8/2007 | ............. B65D 47/20 |

(Continued)

*Primary Examiner* — Craig J Price
*Assistant Examiner* — Andrew J Rost
(74) *Attorney, Agent, or Firm* — HAYES SOLOWAY P.C.

(57) ABSTRACT

A dosing unit for dosing fluids includes a fluid guiding module having a fluid inlet and a fluid outlet, a solenoid valve for controlling or regulating a fluid flow through the fluid guiding module, and a dosing tip, the fluid outlet of the fluid guiding module leading to the fluid inlet of the dosing tip, and the dosing tip having an elastic, self-closing outlet nozzle. Furthermore, a dosing station and a dosing tip are specified.

16 Claims, 13 Drawing Sheets

(56) References Cited

U.S. PATENT DOCUMENTS

| | | | | |
|---|---|---|---|---|
| 6,382,255 B2* | 5/2002 | McFarland | ............ | F16K 15/147 137/849 |
| 6,769,577 B1* | 8/2004 | Feierabend | ........ | B65D 47/2031 222/490 |
| 7,389,788 B2* | 6/2008 | Wilson | .................. | F16K 15/147 137/112 |
| 7,836,922 B2 | 11/2010 | Poole et al. | .............. | B65B 1/04 |
| 8,276,616 B2* | 10/2012 | Wright | .................. | F16K 15/147 137/850 |
| 10,138,107 B2* | 11/2018 | Zemko | ................. | B67D 1/1218 |
| 10,167,968 B1* | 1/2019 | Bixler | .................. | F16K 15/147 |
| 2005/0187524 A1* | 8/2005 | Willis | ................ | A61J 15/0042 604/256 |
| 2007/0246100 A1* | 10/2007 | Stephens | ............... | F16K 15/147 137/382 |
| 2011/0017933 A1 | 1/2011 | Kuo | .............................. | 251/321 |
| 2011/0173933 A1 | 7/2011 | Maheshwari et al. | .......... | 53/473 |
| 2013/0334452 A1* | 12/2013 | Morselli | ................. | F16K 15/14 251/331 |
| 2015/0008243 A1* | 1/2015 | Chen | ....................... | B05B 7/005 222/190 |
| 2015/0050381 A1* | 2/2015 | Schmidt | ................ | F16K 27/003 425/535 |
| 2017/0002940 A1* | 1/2017 | Nijland | ................. | F16K 15/147 |
| 2017/0002941 A1* | 1/2017 | Nijland | ................. | F16K 15/147 |
| 2018/0125624 A1 | 5/2018 | Tweedie et al. | ....... | A61C 17/34 |

FOREIGN PATENT DOCUMENTS

| | | | | |
|---|---|---|---|---|
| EP | 0816245 | 10/1999 | ............ | B65D 47/20 |
| EP | 1958883 | 1/2010 | ............ | B65D 47/20 |
| EP | 3 100 959 | 7/2016 | ............ | B65B 39/20 |
| FR | 2 370 683 | 11/1976 | ............... | B67D 5/30 |

* cited by examiner

DOSING UNIT FOR DOSING FLUIDS, DOSING STATION AND DOSING TIP FOR A DOSING UNIT

BACKGROUND OF THE INVENTION

The invention relates to a dosing unit for dosing fluids, to a dosing station for dosing fluids having at least two dosing units, and to a dosing tip for a dosing unit.

Dosing units serve to dose fluids, in particular to dose very small fluid quantities between 0.2 ml and 4 ml. The dosing is for example carried out in a time-controlled manner.

The dosing units can be used individually or can be combined with further dosing units to form a dosing station.

With known dosing solutions, a few drops of a fluid still drip out of the dosing unit after the actual dosing, which has a negative effect on the dosing accuracy or leads to entrainment. In addition, a relatively high pressure is required for dosing, in particular a pressure of 10 bar or more.

Document EP 3 100 959 A1 discloses an elastic tip for filling a fluid which is configured in a star-shape in the front view. In the area of the side walls starting from the star-shaped opening, outwardly pointing projections are integrally molded in one piece and are intended to make this part of the side wall more stable in order to give the wall a plate-like shape.

A dosing unit for dosing fluids having numerous valves is known from document US 20111017933 A1.

Finally, document U.S. Pat. No. 5,524,792 A describes a filling nozzle having an integrated PTC element for heating the inner surface of the nozzle body.

SUMMARY OF THE INVENTION

The object of the present invention is to enable a particularly precise and simple dosing of small fluid quantities.

According to the invention, this object is achieved by a dosing unit for dosing fluids, which comprises a fluid guiding module having a fluid inlet and a fluid outlet, a solenoid valve for controlling or regulating a fluid flow through the fluid guiding module, and a dosing tip, the fluid outlet of the fluid guiding module leading to the fluid inlet of the dosing tip and the dosing tip comprising an elastic, self-closing outlet nozzle.

The dosing tip has a dosing tip upper part and a dosing tip lower part, a fluid inlet of the dosing tip being formed in the dosing tip upper part and a fluid outlet, of the dosing tip being formed in the dosing tip lower part, and the outlet nozzle being held in a form-fitting manner between the dosing tip lower part and the dosing tip upper part. Thus, the outlet nozzle is held stable and can be mounted in a defined position. The dosing tip upper part and the dosing tip lower part are for example screwed together.

In particular, the dosing tip is screwed directly into the fluid guiding module, so that the fluid guiding module can be configured in a very simple, manner and does not require any projections on which an elastic outlet nozzle is mounted.

Preferably, numerous dosing tips are screwed into the fluid guiding module, so that numerous outlets are provided.

This kind of fastening allows a good, exact fit of the outlet nozzle and a perfect centering. Furthermore, the outlet nozzle can be quickly exchanged. In addition, due to the dosing tip upper part and dosing tip lower part, it is also possible to mount different outlet nozzles to the fluid guiding module by changing the dosing tip upper part and the dosing tip lower part used.

An elastic, self-closing outlet nozzle enables a particularly precise dosing of fluids, in particular at a relatively low fluid pressure of 1 to 2 bar.

In this way, relatively large quantities of a fluid can be dosed in relation to a relatively short time available.

Due to its elasticity, the outlet nozzle can be opened by the fluid pressure during a dosing process and can then be closed again automatically by an elastic restoring force. The outlet nozzle only opens at a defined pressure. This means that the outlet nozzle lets pass an existing fluid volume present at the outlet nozzle abruptly, then closes again and retains a residual amount of fluid, in particular when the solenoid valve is closed. The dosing is carried out in a discrete manner, i.e. without dripping. The pressure at which the outlet nozzle, opens is preferably between 1 bar and 2 bar.

The fluid is in particular delivered via a fluid outlet of the dosing tip.

According to one embodiment, the outlet nozzle has at least two closing surfaces which, in the closed state of the outlet nozzle, are in flat contact with each other, a flexible membrane being integrally formed onto each of the closing surfaces, which defines at least a portion of a peripheral enveloping surface of the outlet nozzle. With such an outlet nozzle, precise dosing can be carried out even with relatively large nominal widths, in particular with nominal widths of 2 mm to 4 mm.

The length of the closing surfaces in the longitudinal direction of the dosing tip is preferably greater than a thickness of the membrane. Therefore, the outlet nozzle is sufficiently flexible to allow a rapid opening and closing of the outlet nozzle, and the closing surfaces are sufficiently large for a reliably tight closure of the outlet nozzle.

For example, the outlet nozzle has at least six closing surfaces, which are respectively in flat contact with each other in pairs in the closed state of the outlet nozzle, a hinge being present between two respective intersecting closing surfaces that merge into each other. The hinge contributes to the fact that the outlet nozzle opens quickly even at low fluid pressure, which improves the response time of the dosing unit.

For centering the outlet nozzle, a variant of the invention provides that the dosing tip upper part includes a portion conically tapering towards the outlet nozzle on its front side directed towards the outlet nozzle. The outlet nozzle has in sections an accordingly conically shaped portion on its inside, so that the conically tapering portion of the inside sits on the conically tapering, portion of the dosing tip upper part in the mounted state of the dosing tip and is centered there. The outlet nozzle can of course also, be configured so as to be completely conical on its inside. The conical portion then forms the entire inside.

According to one embodiment, the closing surfaces of the dosing tip complement each other in a top view in the dosed state so as to be slit-shaped, cross-shaped or star-shaped. A closing force of the outlet nozzle can be set on the basis of the number and arrangement of the closing surfaces. in this way, the outlet nozzle can be optimized for different dosing processes. For example, a cross or star shape requires a higher fluid pressure to open the outlet nozzle than a slot shape.

In addition, the outlet nozzle can have a circumferential collar which is held between the dosing tip upper part and the dosing tip lower part.

The dosing tip may include at least two mutually attracting magnetic elements which urge the outlet nozzle into a closed position. The magnetic elements are for example permanent magnets. The magnetic elements additionally improve a closing force of the outlet nozzle. in particular, the magnetic elements supplement the elastic restoring force of the outlet nozzle. Consequently, the magnetic elements optimize the opening and closing behavior of the dosing tip, in particular of the outlet nozzle.

Preferably, receptacles for the magnetic elements, for example in the form of pockets, are provided in the outlet nozzle. This makes it particularly easy to fasten the magnetic elements to the outlet nozzle without the need for any further fastening elements. In particular, the magnetic elements can be held in a form-fitting manner in the receptacles.

Preferably, the free end of the outlet nozzle does riot protrude from the end of the dosing tip lover part, thus protecting it.

For example, the receptacles may be dimensioned so as to be slightly smaller than the magnetic elements so that the receptacles are slightly stretched when the magnetic elements are received. The magnetic elements can thus be held particularly reliably on the outlet nozzle.

Alternatively or in addition, a magnetic fastening module can be arranged at the dosing tip to fix the magnetic elements. The magnetic fastening module mechanically secures the magnetic elements to the dosing tip. For example, the magnetic fastening module is a disc placed on the dosing tip.

It is also conceivable that the magnetic elements are embedded in the outlet nozzle, the magnetic elements being in particular partially, in particular completely insert-molded with the material of the outlet nozzle.

According to one embodiment, the magnetic elements can be permanent-magnetic particles, wherein the outlet nozzle can be interspersed with permanent-magnetic particles at least in the area of the closing surfaces. In this way, a restoring force of the outlet nozzle can also be supported and the opening and closing behavior of the outlet nozzle can be improved.

In the case of insert-molded magnetic elements or when using permanent-magnetic particles penetrating the outlet nozzle, the formation of receptacles and/or the use of a magnetic fastening module can be dispensed with, The outlet nozzle is preferably in one piece. This makes the outlet nozzle easy to manufacture, for example by injection-molding. In addition, the dosing unit, in particular the dosing tip, is easy to mount.

For example, the outlet nozzle comprises silicone, fluororubber, perfluororubber and/or a thermoplastic elastomer or is made of one of these materials. Depending on the material thickness, these materials are sufficiently stable to ensure a tight closing of the outlet nozzle, and sufficiently flexible to allow easy opening.

For example, a nominal width of the dosing tip is 4 mm. The nominal width is determined by an inlet diameter of the outlet nozzle.

For example, the dosing unit has a fluid inlet module, a fluid outlet of the fluid inlet module being connected to a fluid inlet of the fluid guiding module. Thus, a fluid to be dosed can be supplied to the fluid guiding module via the fluid inlet module.

In order to enable a time-controlled dosing of a fluid, the dosing unit, in particular the solenoid valve, is connected to a control unit for controlling the fluid delivery. A dosing process takes 25 ms, for example.

The object is further achieved by a dosing station for dosing fluids including at least two dosing units according to the invention. in such a dosing station, a fluid can be dosed into several containers at the same time, Alternatively, different fluids can be dosed one after the other into one container.

The dosing station may comprise a detection means by means of which the presence of a container under a dosing unit, in particular under a dosing tip, can be detected. For example, the detection means comprises a light barrier which is interrupted by a container when the latter is placed under a dosing tip in the intended position for dosing.

Furthermore, the object is achieved according to the invention by a dosing tip for a dosing unit, the dosing tip comprising at least two mutually attracting magnetic elements which urge the outlet nozzle into a closed position.

By means of a dosing tip configured in this way, a particularly precise dosing can be achieved.

The dosing tip according to the invention can be used as a replaceable part in conventional dosing units. Thus, already existing dosing units can be improved by using the dosing tip according to the invention.

The dosing, tip can have the features and advantages already specified above.

According to one embodiment, receptacles for the magnetic elements a be provided in the outlet nozzle.

Alternatively or additionally, a magnetic fastening module can be arranged at the dosing tip for fixing the magnetic elements.

According to a further embodiment, the outlet nozzle can be interspersed with permanent-magnetic particles at least in the area of the closing surfaces.

To dose a fluid, a pressure between 1 bar and 2 bar, in particular a pressure of 1.6 bar, is applied at the fluid inlet of the fluid guiding module.

Such a fluid pressure in combination with a dosing unit or a dosing station according to the invention permits a particularly precise dosing, a dripping being reliably prevented.

The time between two dosing processes is for example between 80 ms and 100 ms.

The dosing time itself is between 10 ms and 0 ms, in particular 25 ms, for example.

During a dosing process, a fluid quantity between 0.2 ml and 4 ml, for example, is respectively dosed.

BRIEF DESCRIPTION OF THE DRAWINGS

Further advantages and features of the invention will become apparent from the description below and from the attached drawings to which reference is made and in which:

FIG. 8 shows a detailed view of area B of FIG. 7, FIGS. 9a and 9b show an alternative outlet nozzle for the dosing tip according to FIG. 3, FIGS. 10a to 10e show a further dosing tip according to the invention, FIG. 11 show the outlet nozzle of the dosing tip of FIGS. 10a to 10d, FIGS. 12a to 12d show a further dosing tip according to the invention.

DETAILED DESCRIPTION OF THE INVENTION

Figure 1A:
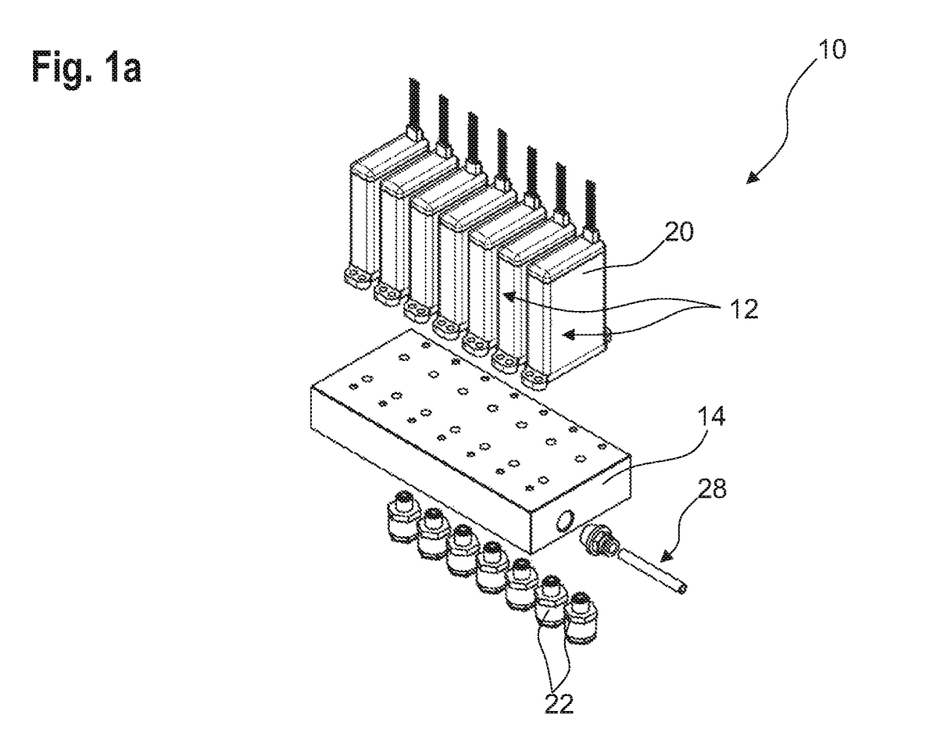
FIGS. 1a to 1e show a dosing station according to the invention in different views.
Figure 1B:
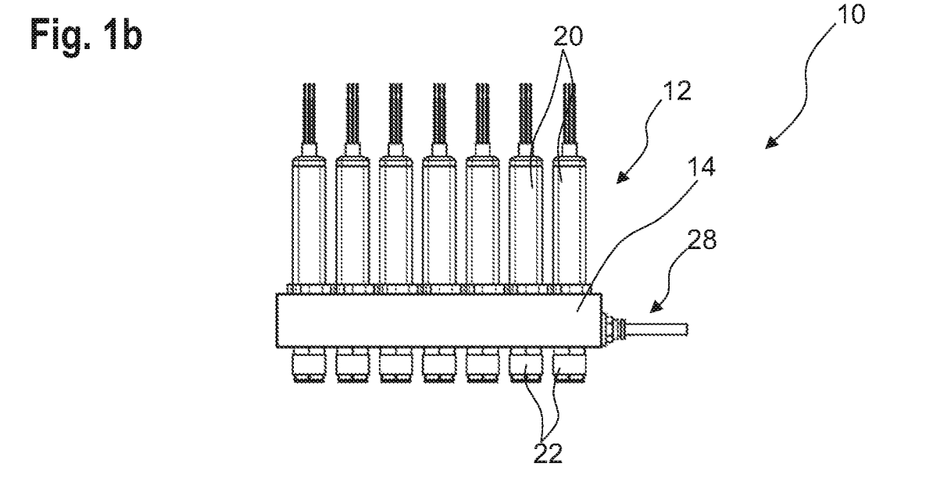
Figure 1C:
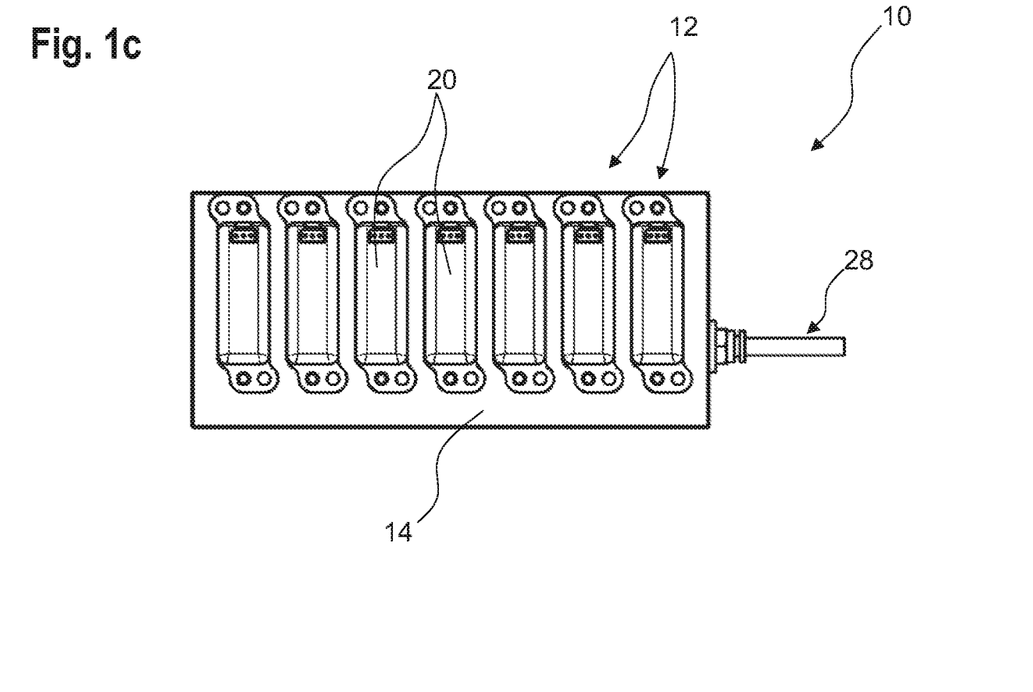
Figure 1D:
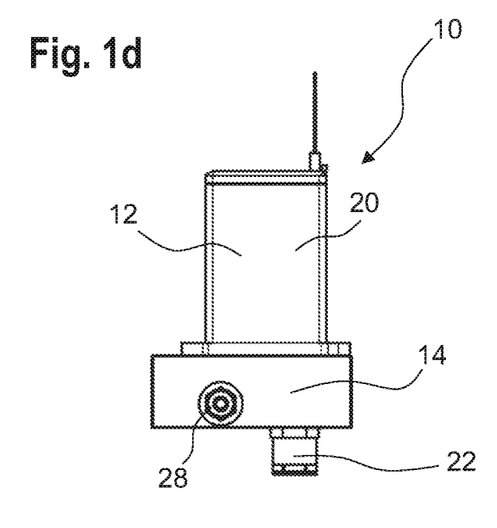
Figure 1E:
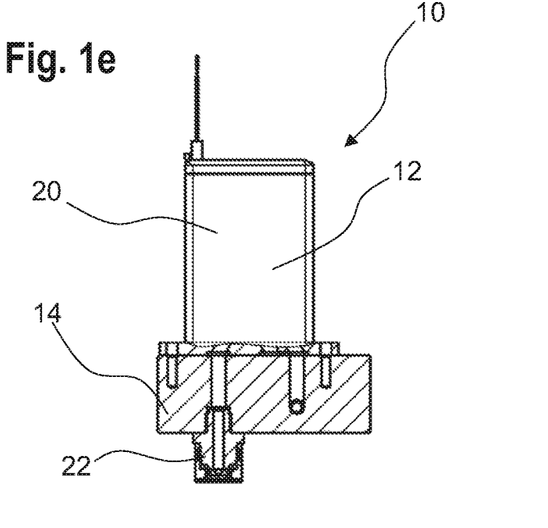

FIGS. 1a to 1e each show a dosing station 10 according to the invention for the dosing of fluids. In particular, FIG. 1a shows the dosing station 10 in an exploded view, FIG. 1b in a front view, FIG. 1c in a top view, FIG. 1d in a side view, and FIG. 1e in a sectional view.

A dosing station 10 is respectively composes of a plurality of dosing units 12, in particular at least two dosing units 12. A dosing unit 12 is illustrated in FIGS. 2a to 2d, FIG. 2a showing an exploded view, FIG. 2b a side view, FIG. 2c a top view and FIG. 2d a sectional view of the dosing unit 12.

Each dosing unit 12 can serve to dose a fluid into a container positioned below the respective dosing unit 12.

As shown in FIGS. 2a to 2d, each dosing unit 12 has a plate-like fluid guiding module 14 through which ducts pass and which includes a fluid inlet 18 and a fluid outlet 18, In the dosing station 10 illustrated in FIG. 1, the fluid guiding modules 14 of the individual dosing units 12 are configured as, a plate-like one-piece unit to simplify the structure of the dosing station 10. The individual dosing units 12 can be connected to each other due to the one-piece configuration of the fluid guiding modules 14. However, the fluid guiding modules 14 can also be formed separately.

Figure 2A:
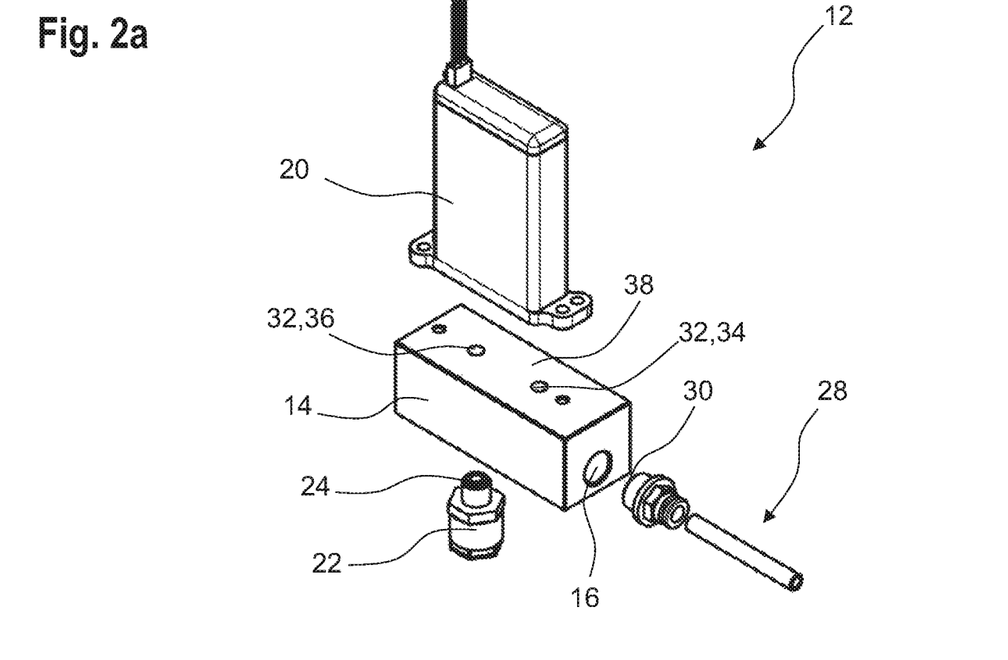
FIGS. 2a to 2d show a dosing unit according to the invention in different views.
Figure 2B:
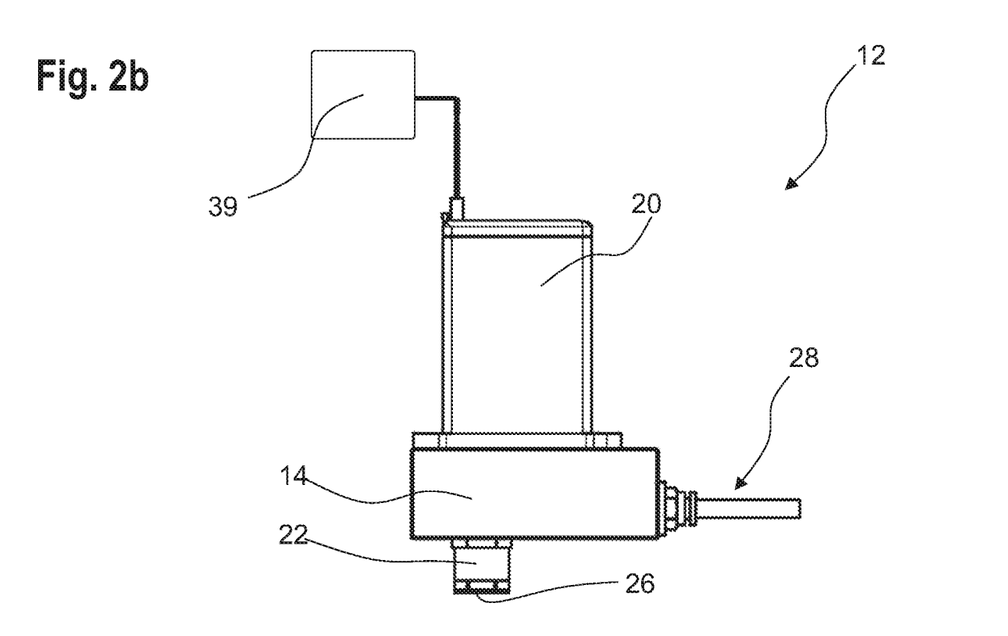
Figure 2C:
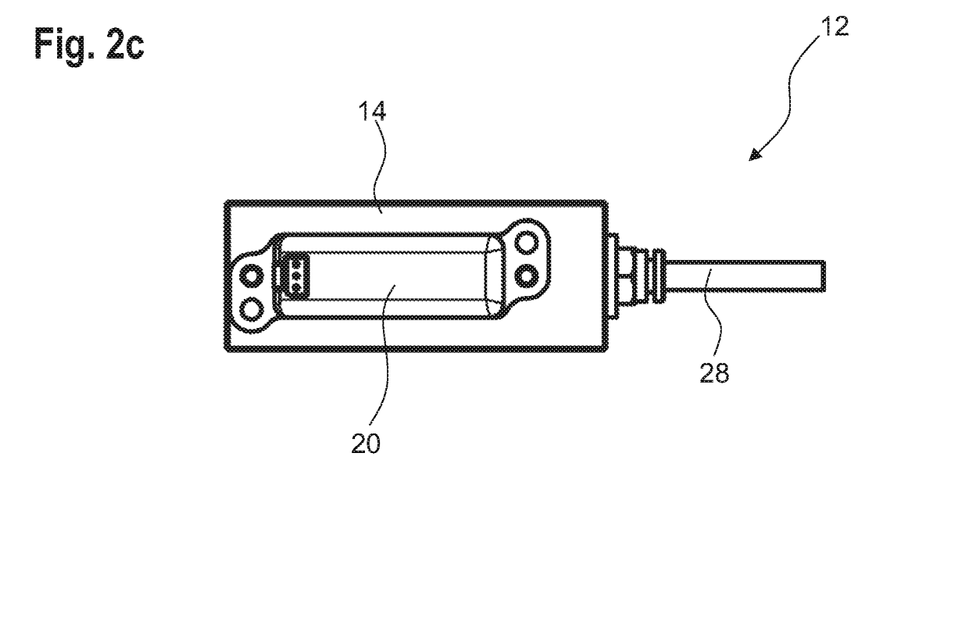
Figure 2D:
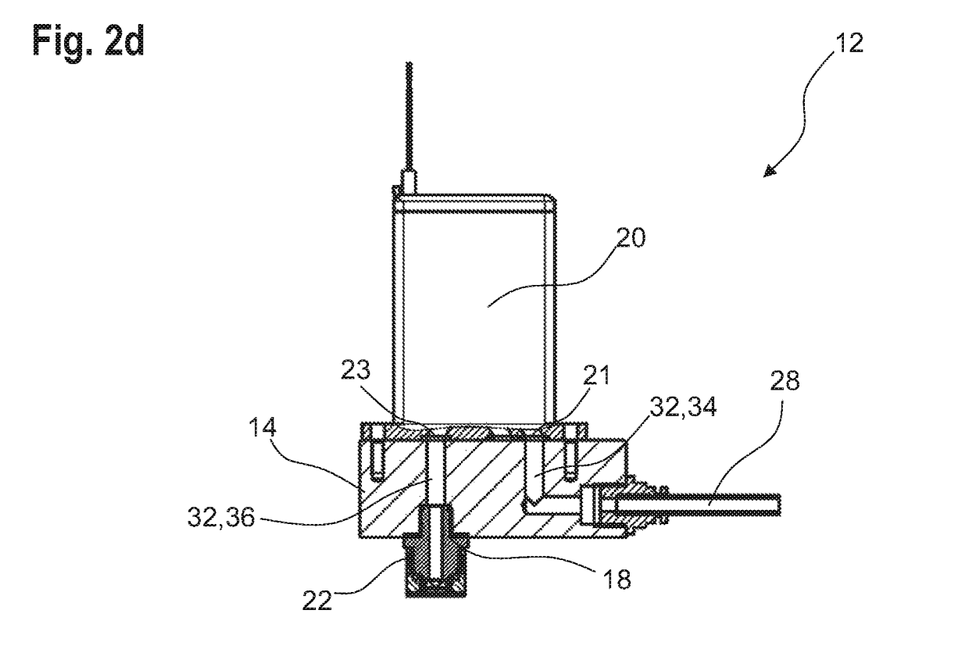

The dosing unit 12 also includes a solenoid valve 20 for regulating a fluid flow through the fluid guiding module 14 and a dosing tip 22, the fluid outlet 18 of the fluid guiding module 14 leading to a fluid inlet 24 of the dosing tip 22 (see FIGS. 2a and 2d). Thus, a fluid can be supplied to the dosing, unit 12 via the fluid inlet 18 of the fluid guiding module 12, which can be dosed into a container via the dosing tip 22, in particular a fluid outlet 26 of the dosing tip 22.

The solenoid valve 20 has at least one solenoid valve inlet 21 and at least one solenoid valve outlet 23. These are visible in the sectional view in FIG. 2d.

Preferably, the solenoid valve 20 is an electromagnetic valve based on the Lorenz principle, a coil being movably arranged in a fixed magnetic circuit.

To facilitate the supply of fluid to the fluid guiding module 14, a fluid inlet module 28 (see FIG. 1b) is provided which has its fluid outlet 30 (see FIG. 2a) connected to the fluid inlet 16 of the fluid guiding module 14.

As shown in FIG. 2d, a fluid main channel 32 extends from the fluid inlet 16 to the fluid outlet 18 of the fluid guiding module 14. However, this duct is not continuous, but comprises two duct sections 34, 36, each of which opens into an upper side 38 of the fluid guiding module 14. The solenoid valve 20 is arranged on the upper side 38 so as to be adapted to regulate a fluid flow from the first duct section 34 to the second duct section 36 and thus the fluid flow through the fluid guiding module 14. In particular, the first duct section 34 leads to the solenoid valve inlet 21 and the second duct section 36 to the solenoid valve outlet 23.

To control fluid delivery, the dosing unit 12, in particular the solenoid valve 20, is connected to a control unit 39, which is shown schematically in FIG. 2b.

Figure 3:
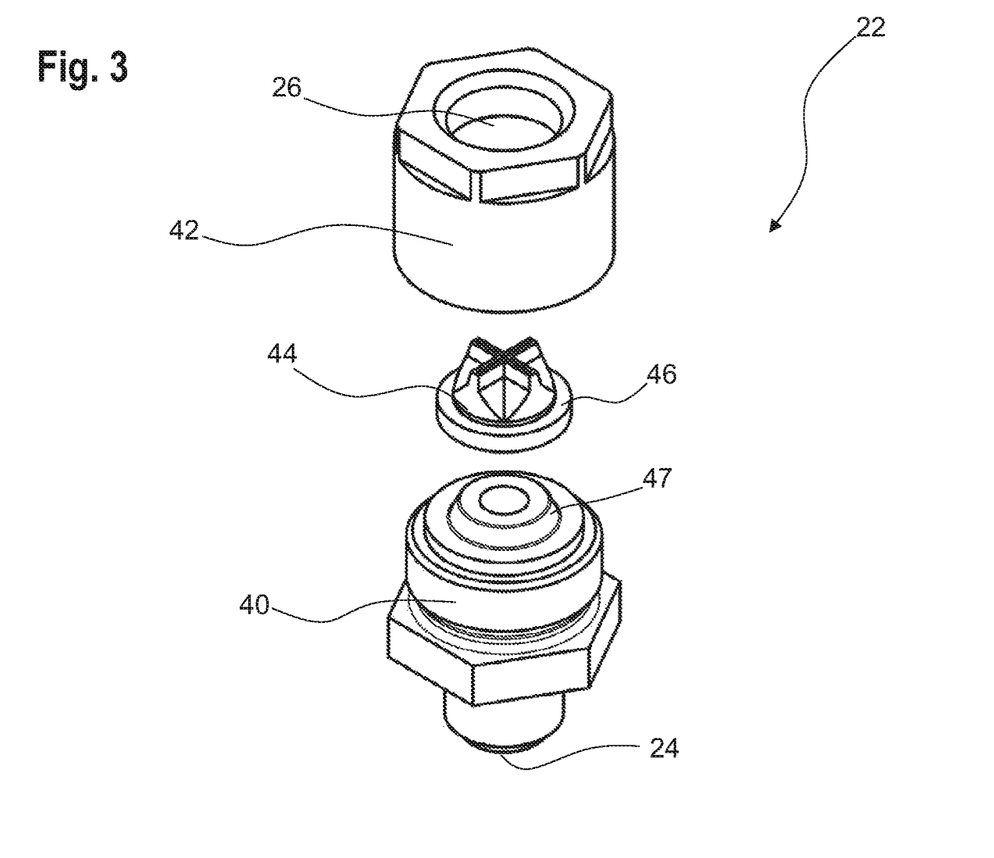
FIG. 3 shows the dosing tip according to the invention of a dosing unit according to the invention in an exploded view.

FIG. 3 shows an exploded view of a dosing tip 22 for the dosing unit 12 illustrated in FIGS. 2a to 2d.

The dosing tip 22 comprises a dosing tip upper part 40 and a dosing tip lower part 42, the fluid inlet 24 of the dosing tip 22 being formed in the dosing tip upper part 40 and the fluid outlet 26 of the dosing tip 22 being formed in the dosing tip lower part 42. The dosing tip upper part 40 and the dosing tip lower part 42 can be connected to each other, for example screwed or welded together.

The dosing tip upper part 40 and the dosing tip lower part 42 are, for example, plastic parts, in particular made of polyphenylene sulfide and/or polyether ether ketone.

The dosing tip 22 further comprises an elastic, self-closing outlet nozzle 44. The outlet nozzle 44 works like a non-return valve in which a fluid flow in one direction is permitted when a fluid pressure acting in the opening direction is applied. In particular, the outlet nozzle 44 serves as a directional element for a fluid jet.

A fluid pressure at which the outlet nozzle 44 opens is between 1 bar and 2 bar, in particular 1.6 bar, for example.

In the mounted state of the dosing tip, the outlet nozzle 44 is held in a form fitting manner between the dosing tip upper part 40 and the dosing tip lower part 42. For this purpose, the outlet nozzle 44 has, for example, a circumferential collar 46 which is held between the dosing tip upper part 40 and the dosing tip lower part 42 in, the mounted state of the dosing tip 22. Optionally, the collar can also be clamped axially.

As can be seen the figures, the free end, here the lower end of the outlet nozzle 44 does not protrude from the dosing tip lower part 42.

Figure 4A:
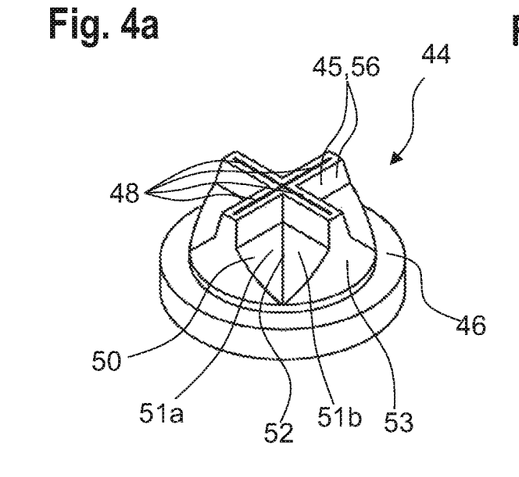
FIGS. 4a and 4b show an outlet nozzle of the dosing tip according to FIG. 3.
Figure 4B:
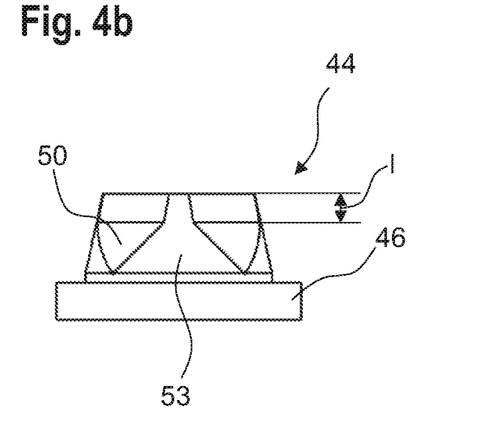
Figure 5:
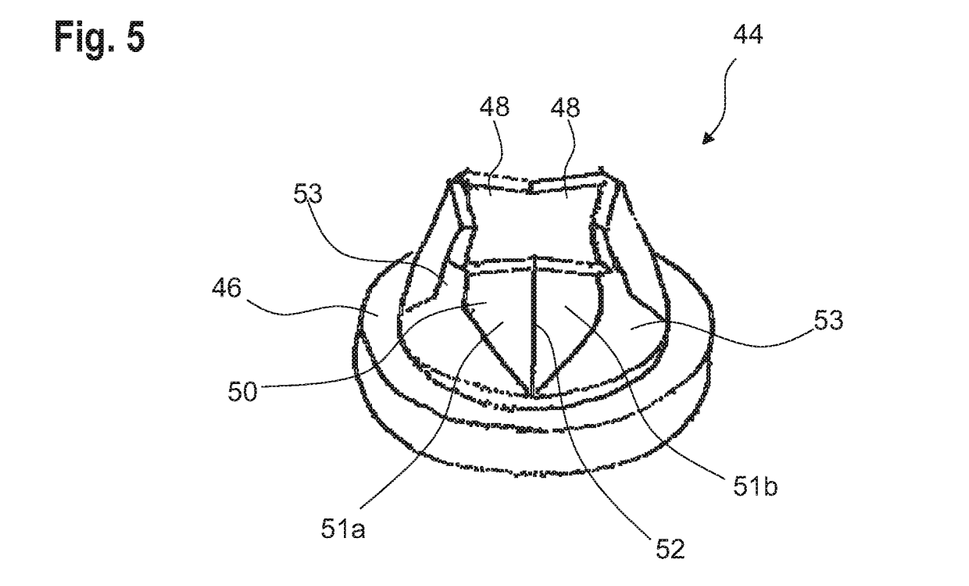
FIG. 5 shows the outlet nozzle from FIGS. 4a and 4b in an open state.

FIGS. 4a and 4b show the outlet nozzle 44 of the dosing by 22 illustrated in FIG. 3 in a perspective view and in a side, view. FIG. 5 shows the outlet nozzle 44 in an open state.

The outlet nozzle 44 is preferably a one-piece part, in particular an injection-molded part.

In the embodiment shown in FIGS. 4a and 4b, the outlet nozzle 44 has a total of eight dosing surfaces 48 which in the closed state of the outlet nozzle 44 are in flat contact with each other to close the dosing tip 22. In particular, in the closed state of the outlet nozzle 44, the closing surfaces 48 are in flat contact with each other in pairs. The closing surfaces 48 complement each other to form a cross shape. As in FIG. 4a the closing surfaces 48 are in contact with each other, the individual closing surfaces 48 are not visible in FIG. 4a. At least two of the closing surfaces 48 are visible in FIG. 5.

A hinge 52 is present between two respective intersecting closing surfaces 48 which merge into each other to facilitate opening the outlet nozzle 44. The hinges 52 are formed, for example, by areas having a reduced material thickness compared to the surrounding area. In particular, the hinges 52 are film hinges or flexure hinges.

A flexible membrane 50 is integrally molded onto each of the closing surfaces 48. The membranes 50 define at least one section of a peripheral enveloping surface 53 of the outlet nozzle 44.

A length I of the closing surfaces 48 in the longitudinal direction of the dosing; tip 22 is greater than a thickness of the membrane 50.

A membrane 50 located between two intersecting closing surfaces 48 is divided by a hinge 52 into two hinge surfaces 51a, 51b, as can be seen particularly clearly in FIGS. 3 and 4a. The hinge surfaces 51a, 51b are, operatively connected to the hinges 52. In this way, a membrane 50 acts like a material hinge.

When a fluid pressure is applied to the outlet nozzle 44, a pressure force acts on the membranes 50, pushing the membranes 50 outwards and pulling the closing surfaces 48 apart from each other, so that the outlet nozzle 44 is opened.

For example, the outlet nozzle 44 contains silicone, fluororubber, perfluororubber, and/or a thermoplastic elastomer or is made of one of these materials. For example, the closing surfaces 48 are molded from one of the specified materials and the membrane 50 may be molded from another of the specified materials, the membrane 50 being preferably injection-molded directly onto the closing surfaces 48.

Optionally, the outlet nozzle 44 can be interspersed, with magnetic elements 56 in the form of permanent-magnetic particles 45, the permanent-magnetic particles 45 being preferably arranged at least in the area of the closing surfaces 48 or only there.

Figure 6:
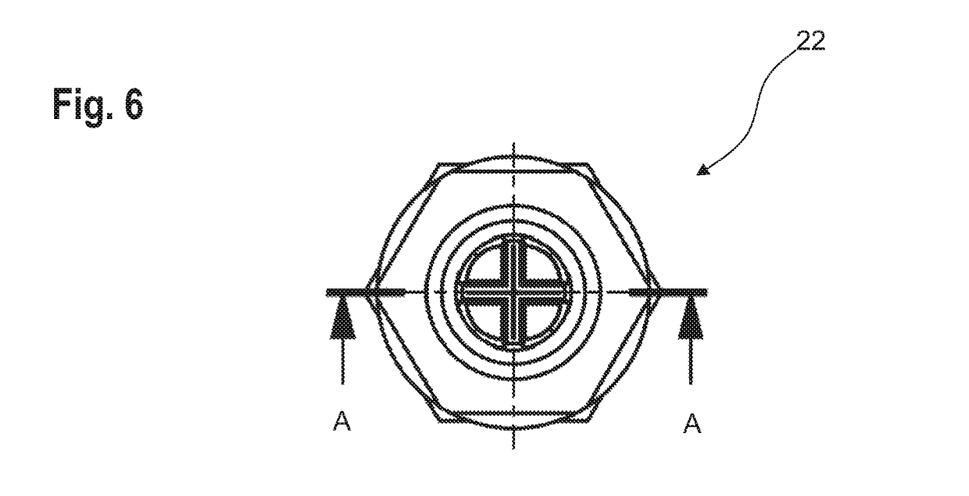
FIG. 6 shows a top view of the dosing tip according to FIG. 3.
Figure 7:
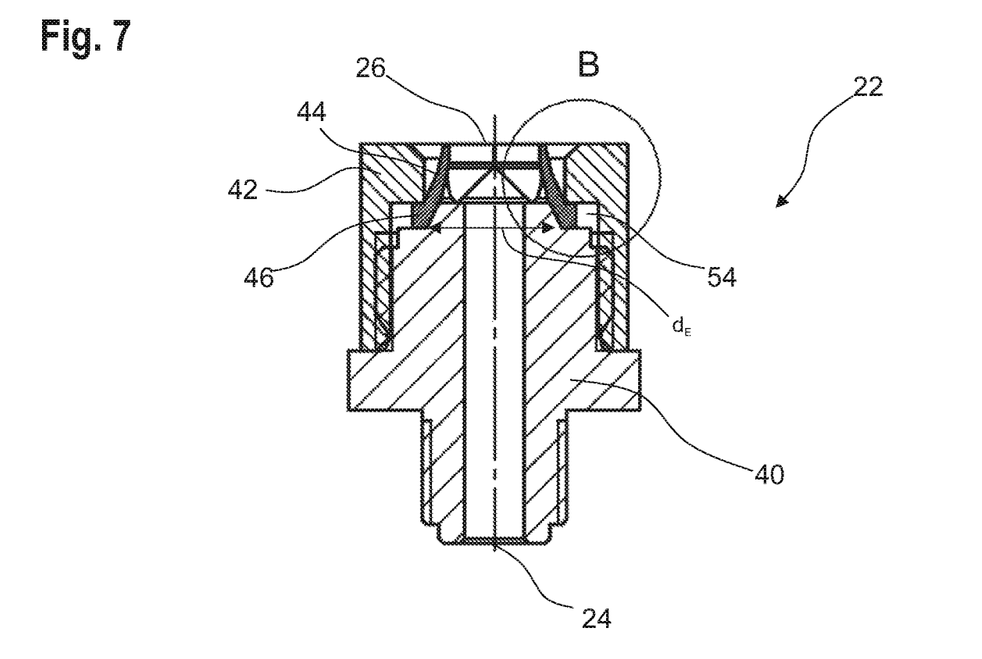
FIG. 7 shows a cut through the dosing tip, along the line A-A in FIG. 6.
Figure 8:
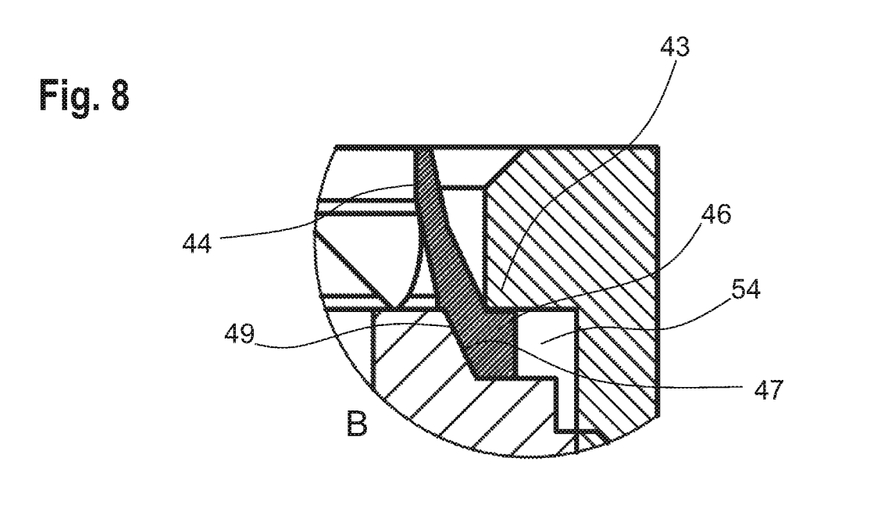

FIGS. 6 to 8 show further views of the dosing tip 22 according to FIG. 3. FIG. 6 shows a top view of the dosing tip 22 of FIG. 3. FIG. 7 shows a section through the dosing tip 22 along the line A-A in FIG. 6, and FIG. 8 shows detailed view of area B in FIG. 7.

FIGS. 7 and 8 illustrate in detail the form-fitting arrangement of the outlet nozzle 44 between the dosing tip upper part 40 and the dosing tip lower part 42

In the mounted state of the dosing tip 22, a gap 54 is in particular produced between an axial inside of the dosing tip lower part 42 and the dosing tip upper part 40, in which the collar 46 of the outlet nozzle 44 is held. In particular, a step 43 is formed in the dosing tip lower part 42, which is in contact with the collar 46 of the outlet nozzle 44 and fixes the outlet nozzle 44 in the axial direction.

In addition, the dosing tip upper part 40 has a section 47 on its front side directed towards the outlet nozzle 44 which conically tapers towards the outlet nozzle 44, which is also shown in FIG. 3. The outlet nozzle 44 is accordingly configured in a conical manner in sections on its inside 49, the conical section of the inside 49 sitting on the conical section 47 of the dosing tip upper part 42 in the mounted state of the dosing tip 22. As a result, the outlet nozzle 44 is oriented so as to be centered in the dosing tip 22 in the mounted state thereof.

Alternatively, other geometries for aligning the outlet nozzle 44 are also conceivable.

When joining the dosing tip upper part 40 with the dosing tip lower part 42, the outlet nozzle 44 arranged therebetween is thus fixed in the dosing tip 22 in a non-positive and form-fitting manner. This leads to the creation of the closing force at the closing surfaces 48

An inlet diameter $d_E$ of the outlet nozzle 44, which can also be referred to as nominal diameter, is for example between 3 mm and 5 mm, in particular 4 mm.

FIG. 7 also illustrates the screw c ion between the dosing tip upper part 40 and the dosing tip lower part 42.

Figure 9A:
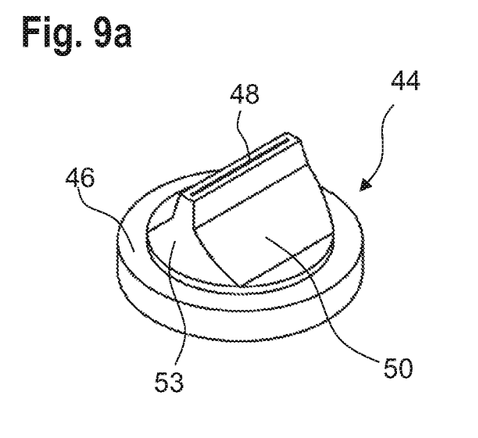
Figure 9B:
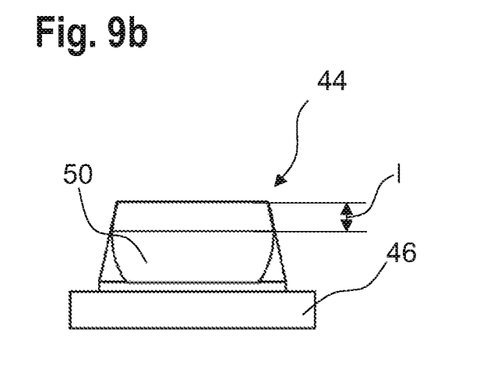

FIGS. 9a and 9b show an outlet nozzle 44 for the dosing tip 22 of FIG. 3 according to a further embodiment. The outlet nozzle 44 according to FIGS. 9a and 9b differs from the outlet nozzle 44 according to FIGS. 5a and 5b in the number of closing surfaces 48. More precisely, the outlet nozzle 44 according to FIGS. 9a and 9b has only two closing surfaces 48 which complement each other to form a slot shape.

According to a further embodiment which is not shown, the outlet nozzle 44 can have six closing surfaces 48, which complement each other to form a star shape.

Figure 10A:
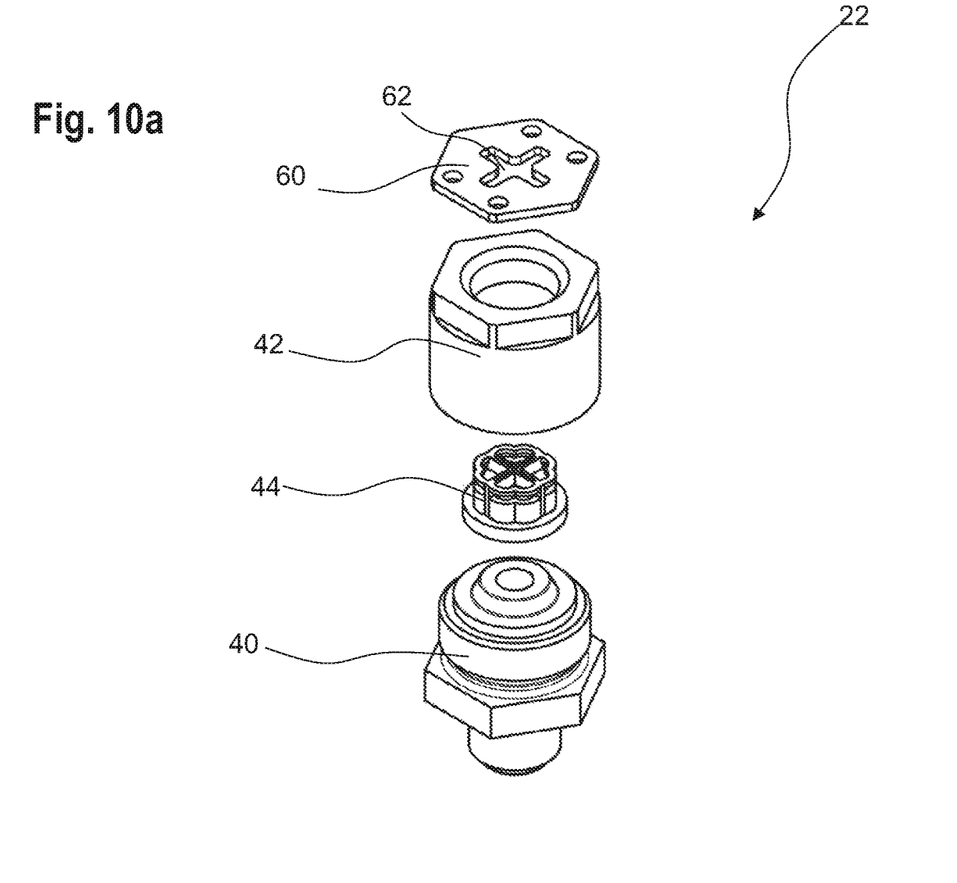
Figure 10B:
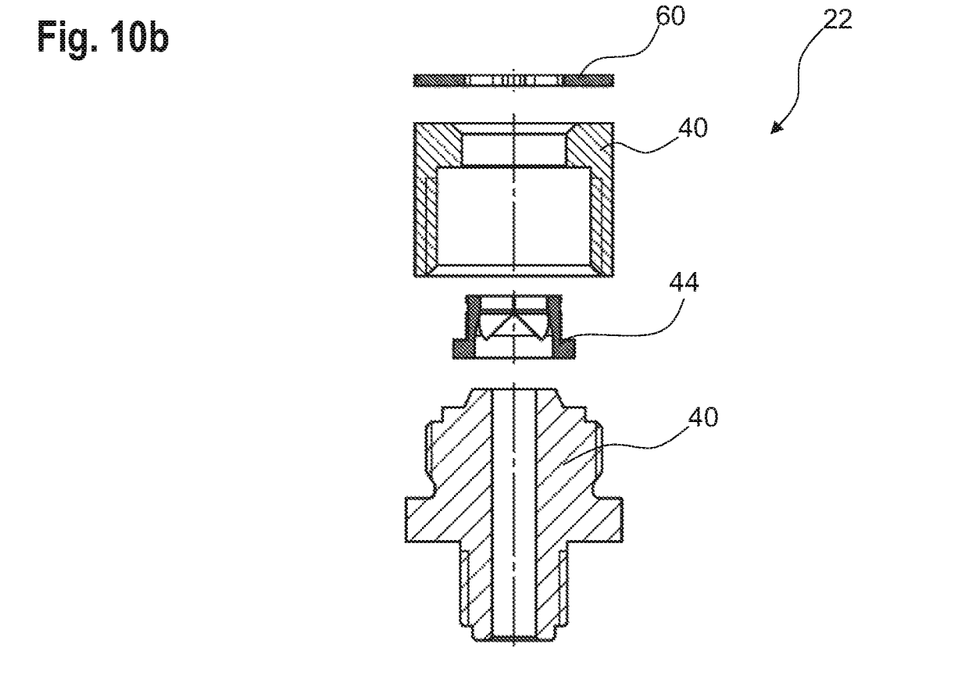
Figure 10C:
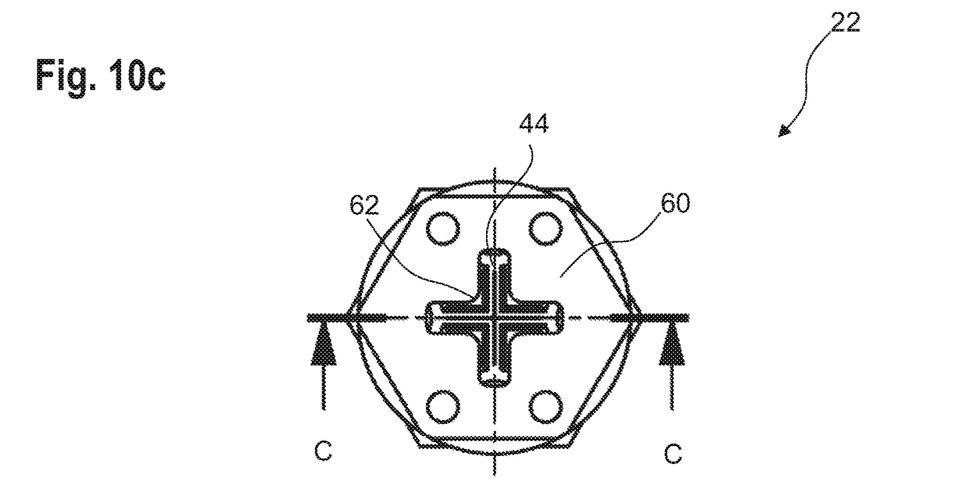
Figure 10D:
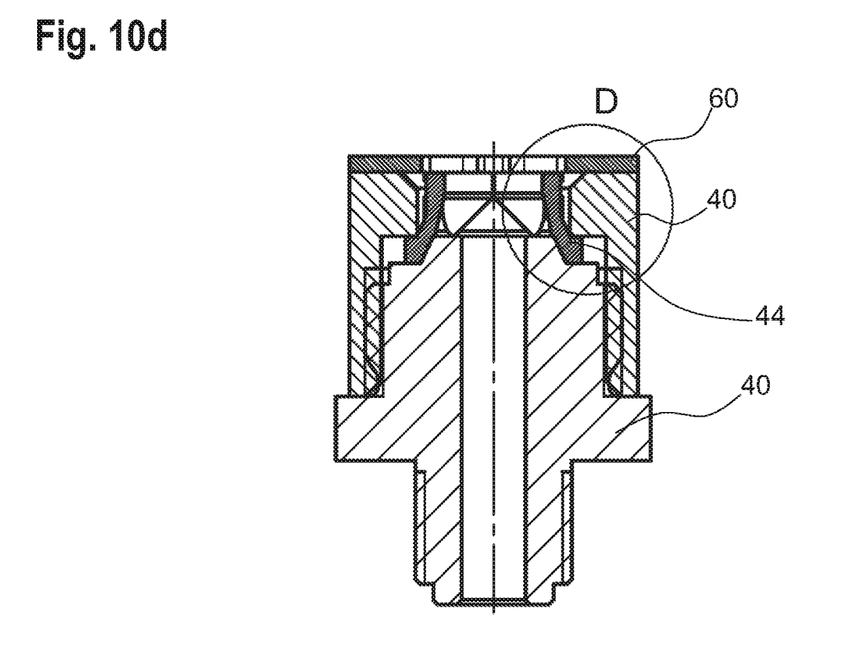
Figure 10E:
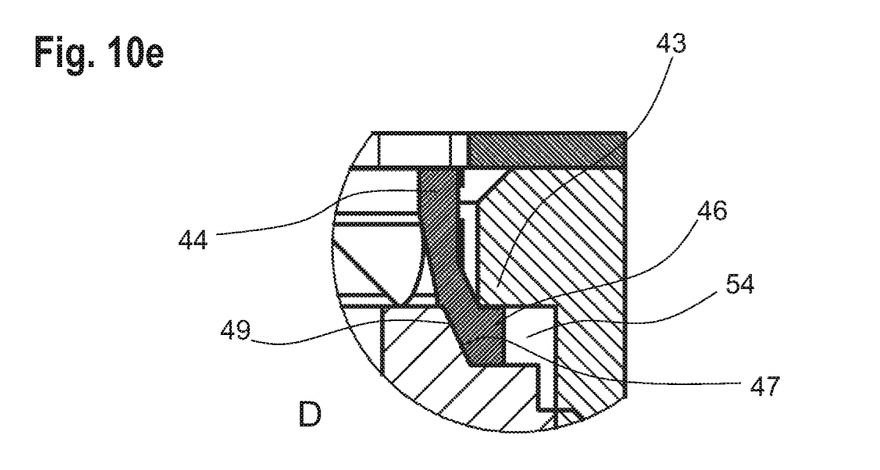

FIGS. 10a to 10e illustrate a dosing tip 22 according to the invention. FIG. 10a shows the dosing tip 22 in an exploded view, FIG. 10b in an exploded sectional view, FIG. 10c in a top view, FIG. 10da section along the line C-C in FIG. 10c, and FIG. 10e a detailed view of the area D in FIG. 10d. The dosing tip 22 according to FIGS. 10a to 10e can also be used in a dosing unit 12 according to FIGS. 2a to 2d.

In contrast to the dosing tip 22 illustrated n FIG. 3, the dosing tip 22 according to FIGS. 10a to 10e has a plurality of magnetic elements 56 (see FIG. 11), in particular four magnetic elements 56. The magnetic elements 56 are, for example, permanent magnets.

Figure 11:
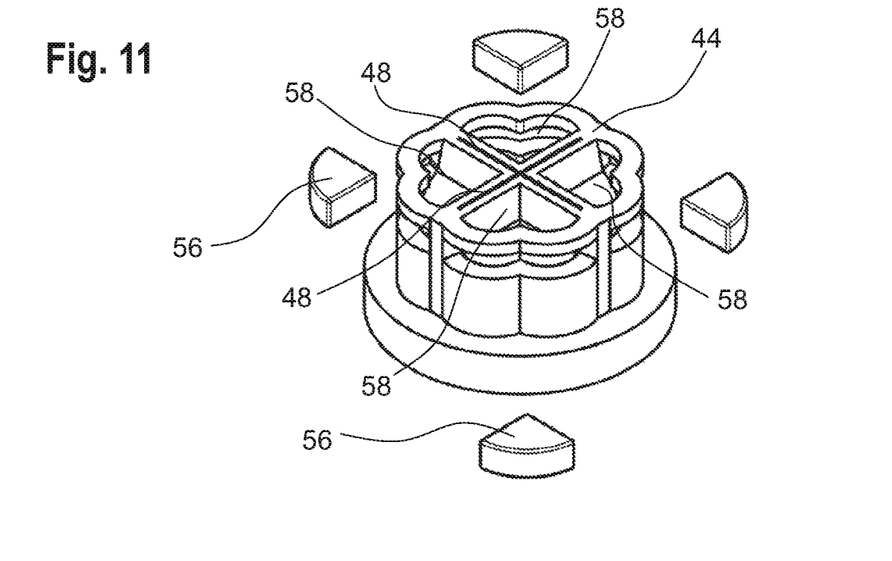

The magnetic elements 56 attract each other and thus urge the outlet nozzle 44, in particular the closing surfaces 48, into their closed position. The outlet nozzle 44 thus closes particularly tightly.

When the outlet nozzle 44 is opened and closed the magnetic elements 6 also move into an open and closed position.

The magnetic elements 56 are clearly illustrated in FIG. 1 which, in addition to the magnetic elements 56, shows the outlet nozzle 44 of the dosing tip 22 according to FIGS. 10a to 10e in detail.

In the embodiment according to FIGS. 10a to 10e, the magnetic elements 56 each fill a free space between two intersecting closing surfaces 48. The individual magnetic elements 56 have a quarter-circular basic shape.

In order to hold the magnetic elements 56 at the outlet nozzle 44, receptacles 58 in which the magnetic elements 56 can be inserted are provided at the outlet nozzle 44. The receptacles 58 are in particular formed in one piece with the outlet nozzle 44. The receptacles 58 are for example configured as pockets.

In the example embodiment shown in FIG. 11, the receptacles 58 are heart-shaped. By means of receptacles 58 formed in this way, quarter-circular magnetic elements 56 can be held particularly well.

Alternatively or in addition to the receptacles 58, a magnetic fastening module 60 (see FIGS. 10b to 10d) is arranged at the dosing tip 22, in particular at an outlet side of the dosing tip 22, to hold the magnetic elements 56 particularly reliably at the dosing tip 22. In the example embodiment shown, the magnetic fastening module 60 is a disc. The magnet mounting module 60, in particular the disc, has a recess 62 which is adapted to the arrangement of the closing surfaces 48. In other words, the recess 62 is shaped such that a fluid flow through the dosing tip 22 or a fluid dosing is not impaired.

According to a further embodiment, the magnetic elements 56 can be partially or completely insert-molded. In this way, the magnetic elements 56 can be fastened to the outlet nozzle 44 such that they cannot be detached from the outlet nozzle 44 without being destroyed.

Figure 12A:
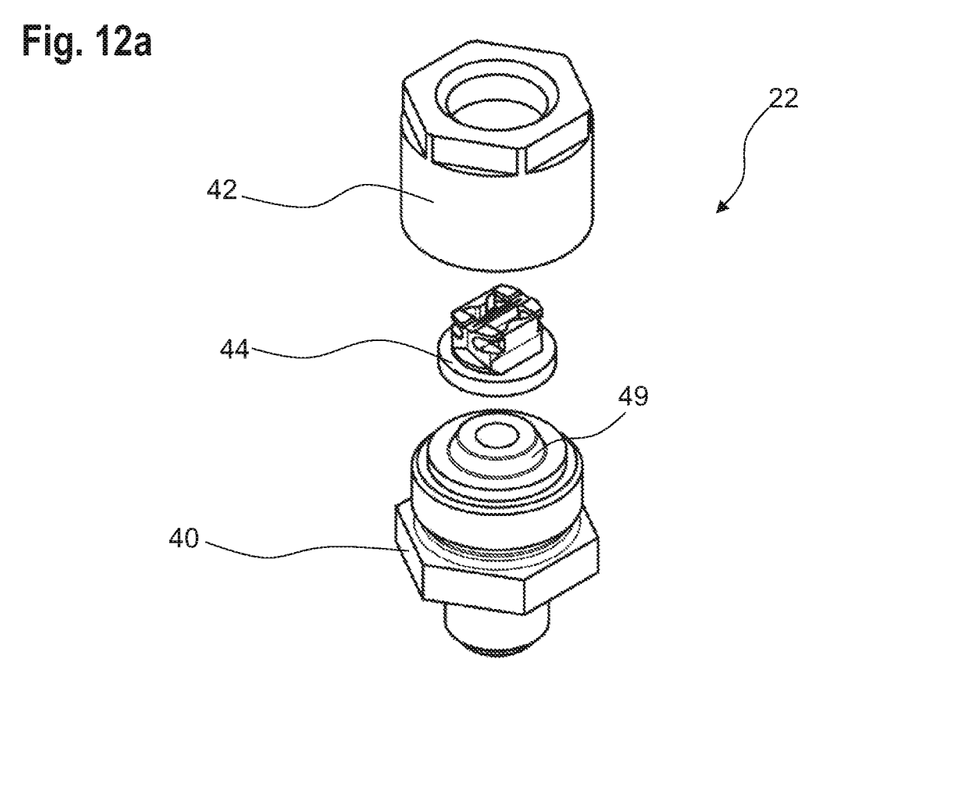
Figure 12B:
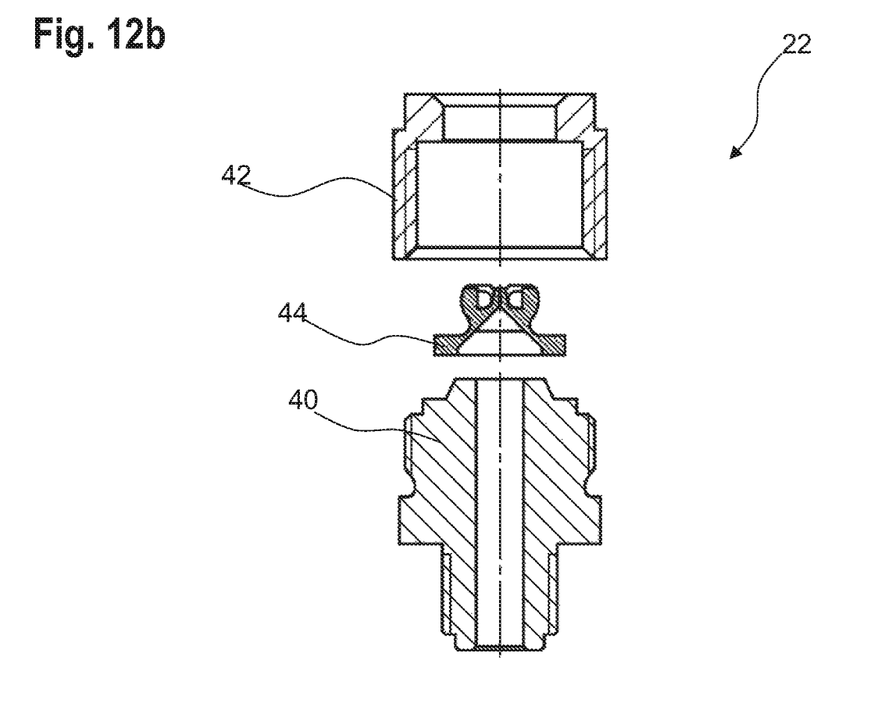
Figure 12C:
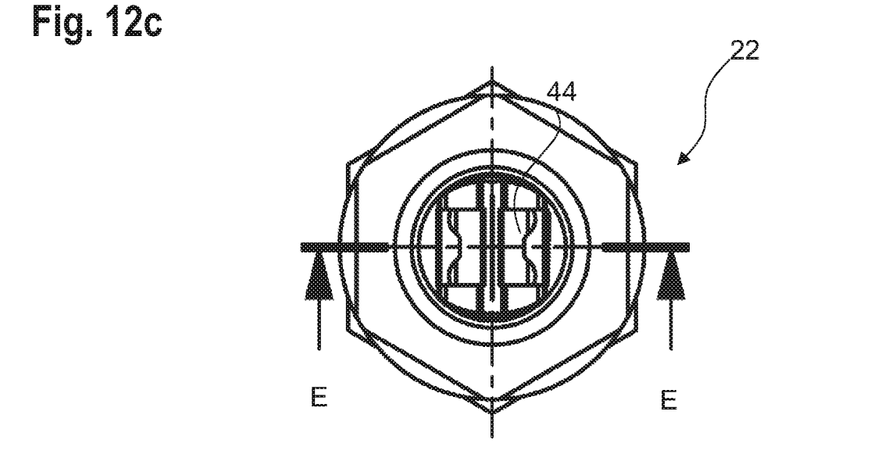
Figure 12D:
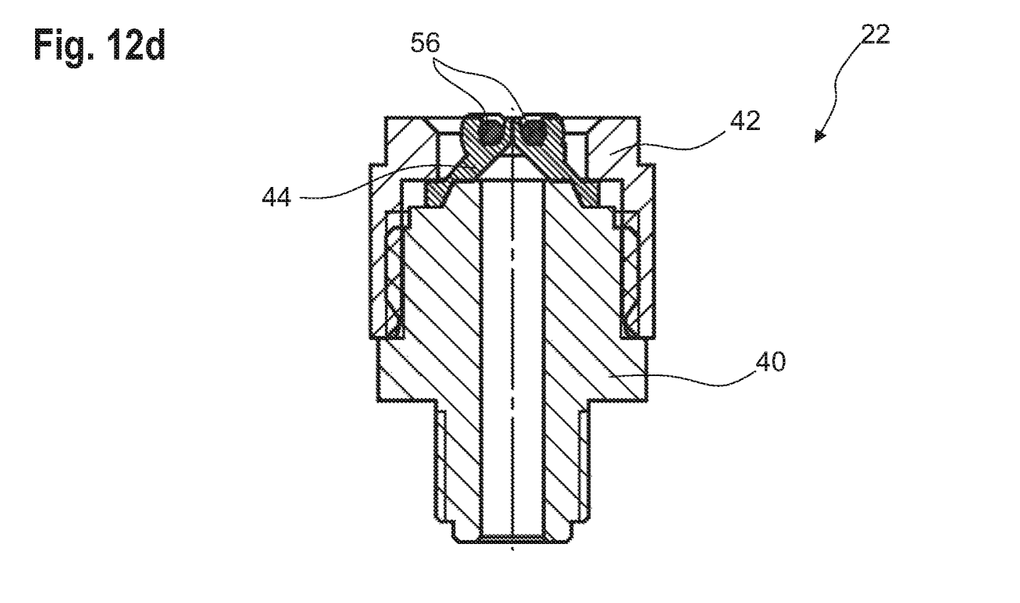

FIGS. 12a to 12d illustrate a dosing tip 22 according to a further embodiment according to the invention. FIG. 12a shows the dosing tip 22 in an exploded view of, FIG. 12b in an exploded sectional view, FIG. 12c in a top view and FIG. 12d in a section along the line EE in FIG. 12c.

The dosing tip 22 according to FIGS. 12a to 12d differs from the dosing tip 22 according to FIGS. 10a to 10a in the number of closing surfaces 48 and the number of magnetic elements 56, in particular, the dosing tip 22 has two closing surfaces 48, which complement each other to form a slot and two magnetic elements 56.

The magnetic elements 56 are bar-shaped and extend in particular parallel to the closing surfaces 48 when the cutlet nozzle 44 is closed.

Figure 13:
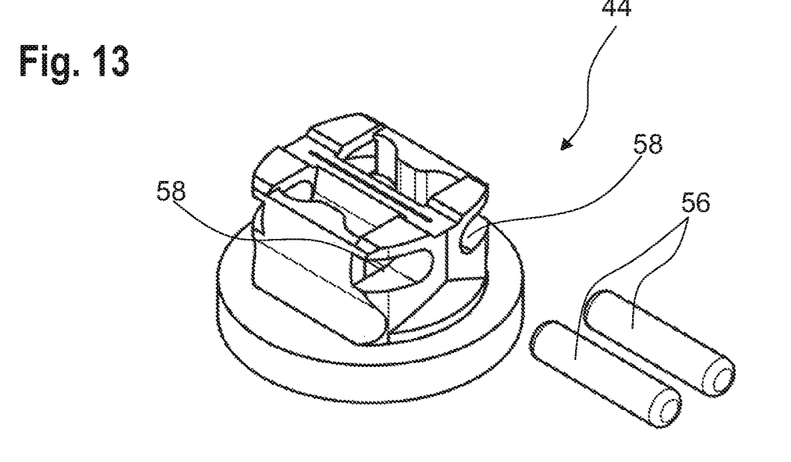
FIG. 13 shows the outlet nozzle of the dosing tip of FIGS. 12a to 12d.

A further difference to the dosing tip 22 according to FIGS. 10a to 10e and 11 is that the receptacles 58 are shaped such that the outlet nozzle 44 overlaps the magnetic elements 56 in the axial direction at least in sections, as can be clearly seen in FIG. 13. In this way, the magnetic elements 56 are also held particularly reliably on the outlet nozzle 44, so that a magnetic fastening module 60 is not required.

FIG. 13 shows the outlet nozzle 44 of the dosing tip 22 illustrated in FIGS. 12a to 12d and the corresponding magnetic elements 56.

Alternatively, magnetic elements 56 in the form of cubes, cuboids or rings or other magnetic elements 56 adapted to the geometry of the outlet nozzle 44 are, also conceivable.

In accordance with a method according to the invention for dosing a fluid using a dosing unit 12 or a dosing station 10, a pressure between 1 bar and 2 bar is applied at the fluid inlet 16 of the fluid guiding module 14, in particular a pressure of 1.6 bar, for dosing a fluid.

The invention claimed is:

1. A dosing unit for dosing fluids, comprising a fluid guiding module having a fluid inlet and a fluid outlet,
    a solenoid valve for controlling or regulating a fluid flow through the fluid guiding module,
    a dosing tip, the fluid outlet of the fluid guiding module leading to a fluid inlet of the dosing tip, wherein the dosing tip comprises a dosing tip upper part and a dosing tip lower part, and the dosing tip comprising an elastic, self-closing outlet nozzle, the outlet nozzle being held in a form-fitting manner between the dosing tip upper part and the dosing tip lower part,
    the outlet nozzle having a circumferential collar which is held between the dosing tip upper part and the dosing tip lower part, wherein the circumferential collar extends from the outlet nozzle in a radial direction,
    wherein the circumferential collar is clamped axially between the dosing tip upper part and the dosing tip lower part,
    wherein a radial gap is present between an outer circumference of the collar of the outlet nozzle and an inner wall of the dosing tip lower part,
    wherein the dosing tip upper part has a section tapering conically towards the outlet nozzle on an end face of the dosing tip upper part directed towards the outlet nozzle, and wherein the outlet nozzle has in sections an accordingly conically tapering section on an inside of the outlet nozzle, so that the conically tapering section of the inside is placed in a centered manner on the conically tapering section of the dosing tip upper part in the mounted state of the dosing tip, wherein the conically tapering section of the dosing tip upper part on which the outlet nozzle is centered is the axially outermost section of the dosing tip upper part and protrudes into the opening of the outlet nozzle, and
    wherein the surface of the outlet nozzle facing the dosing tip lower part is a flat surface.

2. The dosing unit according to claim 1, wherein the fluid inlet of the dosing tip being formed in the dosing tip upper part and a fluid outlet of the dosing tip being formed in the dosing tip lower part.

3. The dosing unit according to claim 1, wherein the outlet nozzle has at least two closing surfaces which, in the closed state of the outlet nozzle, are in flat contact with each other, a flexible membrane which define at least a portion of a circumferential enveloping surface of the outlet nozzle being respectively integrally formed on the closing surfaces.

4. The dosing unit according to claim 1, wherein the dosing tip upper part and the dosing tip lower part are screwed together.

5. The dosing unit according to claim 1, wherein the dosing tip comprises at least two mutually attracting magnetic elements which urge the outlet nozzle into a closed position.

6. The dosing unit according to claim 5, wherein a magnetic fastening module is arranged at the dosing tip for fixing the magnetic elements.

7. The dosing unit according to claim 1, wherein receptacles for the magnetic elements are provided in the outlet nozzle.

8. The dosing unit according to claim 7, wherein a magnetic fastening module is arranged at the dosing tip for fixing the magnetic elements.

9. The dosing unit according to claim 1, wherein the outlet nozzle is in one piece.

10. The dosing unit according to claim 1, wherein the dosing unit is connected to a control unit for controlling the fluid delivery.

11. The dosing unit according claim 1, wherein the outlet nozzle is configured so as to open only when a fluid pressure between 1 bar and 2 bar is applied.

12. A dosing station for dosing fluids, comprising at least two dosing units as claimed in claim 1.

13. A dosing tip for a dosing unit as claimed in claim 1, wherein the dosing tip comprises at least two mutually attracting magnetic elements which urge the outlet nozzle into a closed position.

14. The dosing tip according to claim 13, further comprising receptacles for the magnetic elements are provided in the outlet nozzle and/or in that a magnetic fastening module is arranged at the dosing tip for fixing the magnetic elements.

15. The dosing tip according to claim 14, wherein the magnetic elements are permanent-magnetic particles, the outlet nozzle being interspersed by permanent-magnetic particles at least in the area of the closing surfaces.

16. The dosing tip according to claim 13, wherein the magnetic elements are permanent-magnetic particles, the outlet nozzle being interspersed by permanent-magnetic particles at least in the area of closing surfaces.

* * * * *